(12) United States Patent
Ashok et al.

(10) Patent No.: US 8,457,423 B2
(45) Date of Patent: Jun. 4, 2013

(54) OBJECT-BASED OPTICAL CHARACTER RECOGNITION PRE-PROCESSING ALGORITHM

(75) Inventors: Amit Ashok, Tucson, AZ (US); Joseph C. Dagher, Cambridge, MA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/226,155

(22) Filed: Sep. 6, 2011

(65) Prior Publication Data

US 2012/0063690 A1   Mar. 15, 2012

Related U.S. Application Data

(63) Continuation of application No. PCT/US2010/026535, filed on Mar. 8, 2010.

(60) Provisional application No. 61/157,904, filed on Mar. 6, 2009.

(51) Int. Cl.
*G06K 9/36*   (2006.01)

(52) U.S. Cl.
USPC .......................................................... 382/233

(58) Field of Classification Search
USPC ............... 382/232, 237, 251, 252; 348/420.1, 348/421.1; 358/1.1, 1.9, 2.1, 3.26, 3.27; 375/240.03, 240.24
See application file for complete search history.

(56) References Cited

U.S. PATENT DOCUMENTS

| | | | | |
|---|---|---|---|---|
| 5,333,212 A * | 7/1994 | Ligtenberg | .................... | 382/250 |
| 6,389,162 B2 * | 5/2002 | Maeda | .......................... | 382/172 |
| 6,678,423 B1 * | 1/2004 | Trenary et al. | ................ | 382/250 |
| 7,532,767 B2 * | 5/2009 | Oztan et al. | ................... | 382/268 |
| 7,551,773 B2 * | 6/2009 | Bergman et al. | .............. | 382/166 |

* cited by examiner

*Primary Examiner* — Jose Couso
(74) *Attorney, Agent, or Firm* — Lathrop & Gage LLP

(57) ABSTRACT

A method of pre-processing a defocused image of an object includes applying an object-based sharpening filter on the defocused image to produce a sharper image; and quantizing the sharper image using block-wise quantization. A system for generating decoded text data from alphanumeric information printed upon an object includes a camera that obtains image data of the alphanumeric information. The system also includes a pre-processor that (a) performs block-wise quantization of the image data to form conditioned image data, and (b) performs optical character recognition on the conditioned image data to generate the decoded text data.

10 Claims, 8 Drawing Sheets

OBJECT-BASED OPTICAL CHARACTER RECOGNITION PRE-PROCESSING ALGORITHM

CROSS-REFERENCE TO RELATED APPLICATIONS

This application is a continuation of PCT Patent Application Serial No. PCT/US2010/026535, filed Mar. 8, 2010, which claims the benefit of priority to U.S. Provisional Patent Application No. 61/157,904, filed on 6 Mar. 2009. Both of the above-identified applications are incorporated herein by reference in their entireties.

BACKGROUND

Software and specialized equipment for optical character recognition ("OCR") have become commercially available, but still require specialized hardware. For example, FIG. 1 shows an OCR system 100 which includes specialized business card image capture camera 110 (indicated by a block 110). Camera 110 is configured for capturing an image of an object of interest (e.g., business card) and generating image data 115 (indicated by an arrow). In existing systems, camera 110 is typically add-on equipment that is external to a standard computer and is specialized for the capture of desired images (e.g., of business cards). In order to optimize image capture conditions such as conjugate distance and illumination, camera 110 often includes hardware for holding the business cards at a particular distance and angle from the camera. Camera 110 can also be a box-type setup, including a slot for feeding business cards therethrough and an internal light source and image capture device. Image data 115 is then fed to a computer 120 including OCR software installed thereon. Computer 120 then performs OCR processes on image data 115 and provides an output 125. Output 125 is, for example, a display of a captured image as well as data extracted from the image using the OCR software, such as the business card owner's name and contact information organized into a format that can be fed into available contact management applications.

It is recognized that the add-on equipment, such as shown in FIG. 1, may be regarded by consumers as cumbersome, costly and undesirable.

SUMMARY

A method of pre-processing a defocused image of an object includes applying an object-based sharpening filter on the defocused image to produce a sharper image; and quantizing the sharper image using block-wise quantization.

A system for generating decoded text data from alphanumeric information printed upon an object includes a camera that obtains image data of the alphanumeric information. The system also includes a pre-processor that (a) performs block-wise quantization of the image data to form conditioned image data, and (b) performs optical character recognition on the conditioned image data to generate the decoded text data.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

Figure 1:
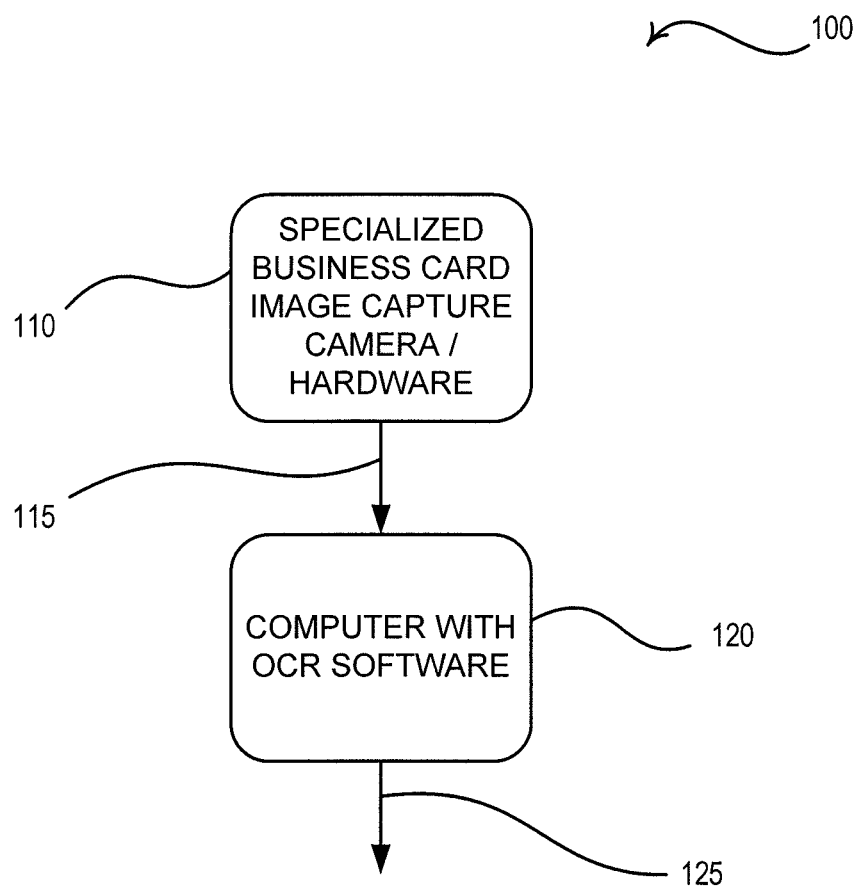
FIG. 1 is a block diagram illustrating a prior art business card OCR system.

While there are specialized business card OCR equipment, hardware and software that are commercially available, they typically utilize specialized hardware in the form of a dedicated scanner, and/or a specialized camera that is "close-focused." As used herein, the term "close-focused" means a camera adjusted such that objects relatively near to the camera are in best focus. In the case of a webcam or laptop camera this means the camera would be adjusted to focus on objects about 15 to 25 cm away from the camera, as opposed to the typical 65 cm distance at which such a camera would typically focus (e.g., to capture an image of a user of a desktop or laptop computer, as suitable for video conferencing). Some such cameras include a business card holder to ensure a business card is held steady at an optimal distance from the camera for OCR input image capture. But close-focused cameras, when available, perform as poor replacements for conventional webcams. For example, their characteristic close focus means that objects at typical ranges for video conferencing will be out of focus. Therefore, it would be desirable to not have to use specialized equipment for business card OCR.

As inclusion of cameras into mobile communication devices, laptop computers and standalone computer systems (such as webcams) becomes more common, it is recognized herein that it would be advantageous to perform OCR on business cards using laptop cameras or webcams that already exist. In this way, users would be able to derive additional functionality from their existing webcams, laptop cameras and other devices with integrated cameras without having to pay for additional hardware.

It is known that OCR generally works best with a sharp image, that is, an image that provides high contrast, well-defined lines and spaces in imaged letters and numbers. A typical optical system provides a sharp image when an object being imaged is at a conjugate distance corresponding to best focus of the optical system. Such a system, imaging an object at best focus, has a modulation transfer function that is relatively high for high spatial frequencies (corresponding to small image details), thus providing a sharp image. However, laptop cameras and webcams typically utilize a fixed focal length optimized for video conferencing applications (e.g., for objects located at conjugate distances around 65 cm), and therefore may not produce a sharp image at close range, such as required for business card OCR. When a currently available laptop camera or webcam is used to image a business card at close range (e.g., a conjugate distance between 15 cm and 25 cm) such that the business card substantially fills a field of view of the camera, the result is a defocused image with low modulation transfer function at high spatial frequencies that is not conducive to OCR. When the business card is placed at a conjugate distance of 65 cm or greater (i.e., the normal design focus distance of the webcam or laptop camera), the captured image is in focus, but the business card is so small in magnification within the image that again, the definition of lines and spaces is impaired, and the image is again not conducive to OCR.

The algorithm described here performs pre-processing on a raw defocused image from a webcam or laptop camera, thereby allowing business card OCR with reasonable accuracy using a built-in webcam or laptop camera. The pre-processed image data is fed to external software, where the actual OCR is performed.

In an embodiment, a pre-processing algorithm described herein works with existing laptop cameras and webcams and with existing OCR software to provide higher accuracy OCR results relative to what is achievable with an image that has not been pre-processed.

Figure 2:
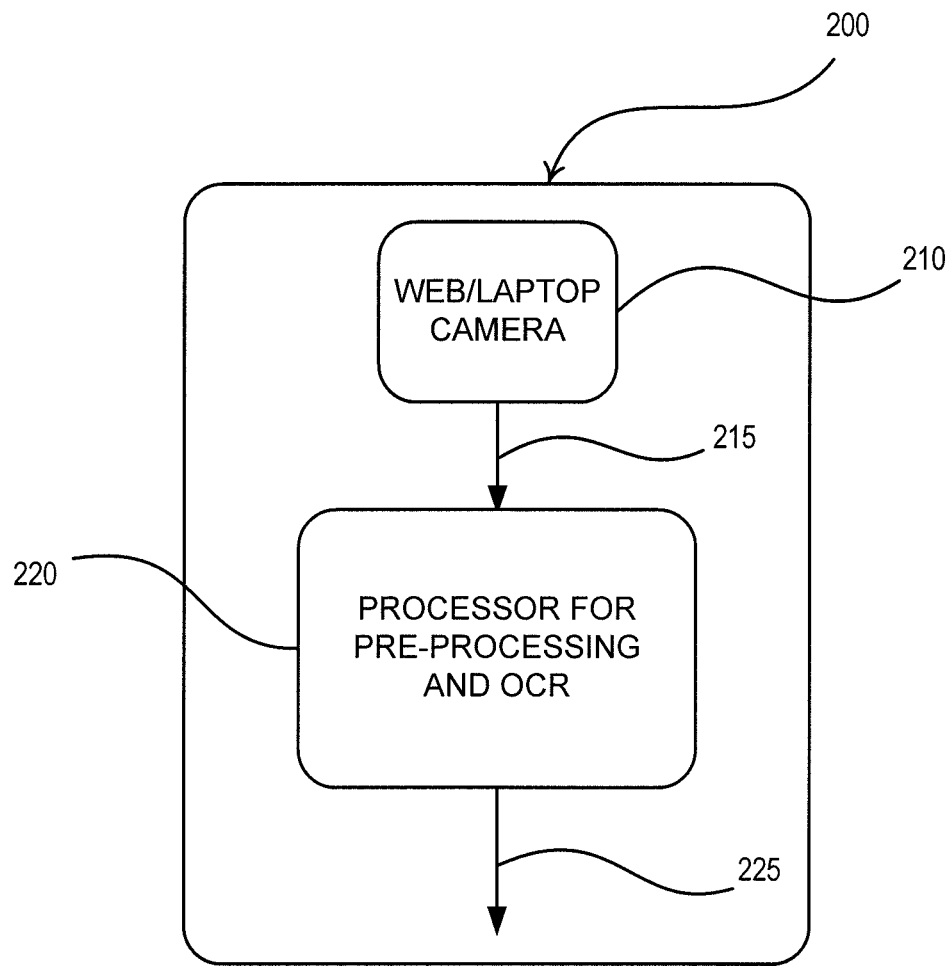
FIG. 2 is a block diagram illustrating a business card OCR system including pre-processing, in accordance with an embodiment.

An example of an OCR system utilizing object based pre-processing, in accordance with an embodiment, is illustrated in FIG. 2. FIG. 2 shows a computer system 200 that includes a webcam or laptop camera 210. Computer system 200 may be, for instance, a desktop system with a webcam, a laptop with an integrated camera or any device with an integrated camera and enough processing power for the pre-processing and OCR. Camera 210 captures an image of a business card and provides image data 215 (indicated by an arrow) to a processor 220 within computer system 200 for pre-processing and OCR. Image data 215 may be, for example, raw image data as captured by camera 210. Optionally, camera 210 may include processing capability for sharpening or edge enhancement, for example. Processor 220 is configured to perform a pre-processing routine on image data 215 as well as to perform the OCR to produce output data 225 (indicated by an arrow). Output data 225 is for example fed into contact management software or an external device. Additionally, camera 210 may be re-optimized to a closer fixed-focus position that provides sufficiently high image quality for video conferencing while facilitating the OCR task. Alternatively, camera 210 may also be equipped with extended depth of field ("EDoF") capabilities by using specialized modification of wavefront phase, such as disclosed in U.S. Pat. No. 5,748,371 to Cathey et al., which is incorporated herein by reference in its entirety. The addition of EDoF capabilities may provide the system designer with more flexibility when designing around performance tradeoffs between video conferencing and OCR applications.

Figure 3:
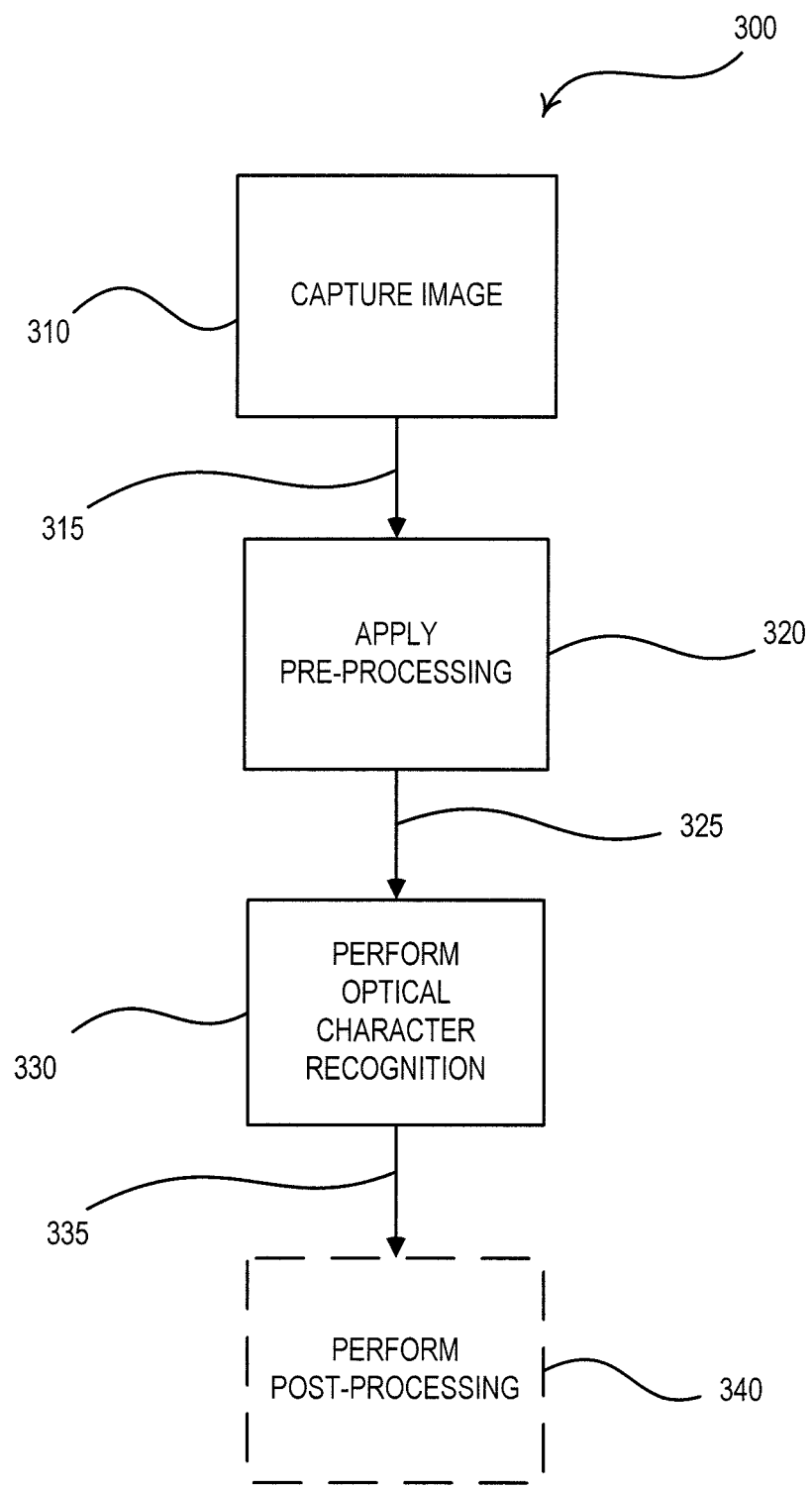
FIG. 3 is a flow chart illustrating a method for performing OCR using the business card OCR system of FIG. 2, in accordance with an embodiment.

Referring now to FIG. 3 in conjunction with FIG. 2, FIG. 3 is a flow chart showing a processing method 300, which may be performed by computer system 200 of FIG. 2, in an embodiment. Processing method 300 begins with a step 310 to capture an image of a business card. In computer system 200, step 310 is performed by webcam or laptop camera 210. Image data 315 (indicated by an arrow) generated at step 310 is pre-processed in step 320. Pre-processing step 320 conditions image data 315 to enhance the accuracy of the OCR results. OCR is performed on conditioned image data 325 (indicated by an arrow) in step 330, thereby generating decoded text data 335 (also indicated by an arrow). Method 300 may be considered complete after step 330, or alternatively, method 300 may continue through an optional post processing step 340 that may include, for example, analysis of decoded text data 335 by contact management software.

Figure 4:
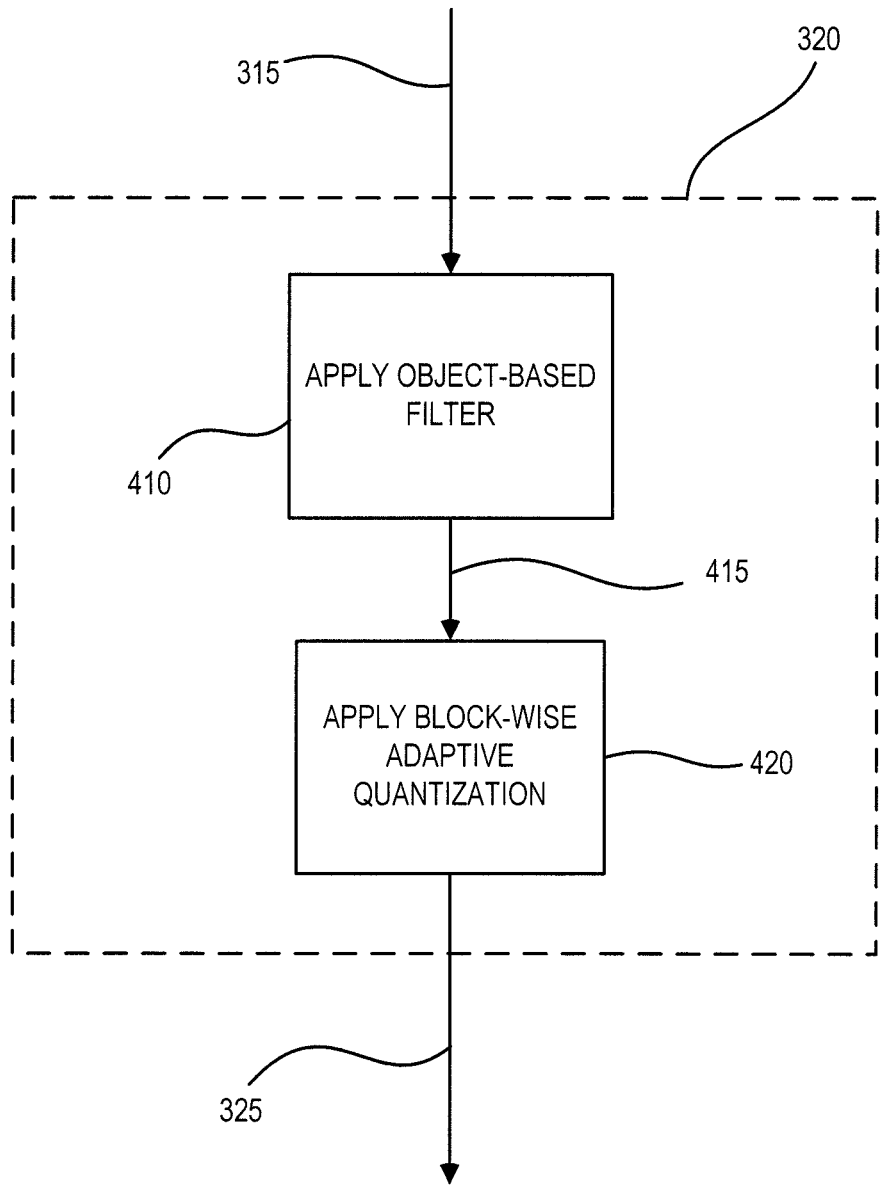
FIG. 4 is a flow chart illustrating further details of a pre-processing step shown in FIG. 3.

Now turning to FIG. 4 in conjunction with FIG. 3, further details of an exemplary embodiment of pre-processing step 320 are illustrated. As shown in FIG. 4, pre-processing step 320 includes applying an object-based ("OB") filter to image data 315, in a step 410. As opposed to a general sharpening filter, the OB filter sharpens the image data in a way that is specific to the objects. In the present example, the objects to be imaged are characters in a business card. Other objects such as, but not limited to, barcodes, biometric patterns or fluorescent beads in a biological sample may also be used as the target object. Step 410 provides filtered image data 415. Adaptive quantization is applied to filtered image data in step 420, producing output data 325 (see also FIG. 3).

Figure 5:
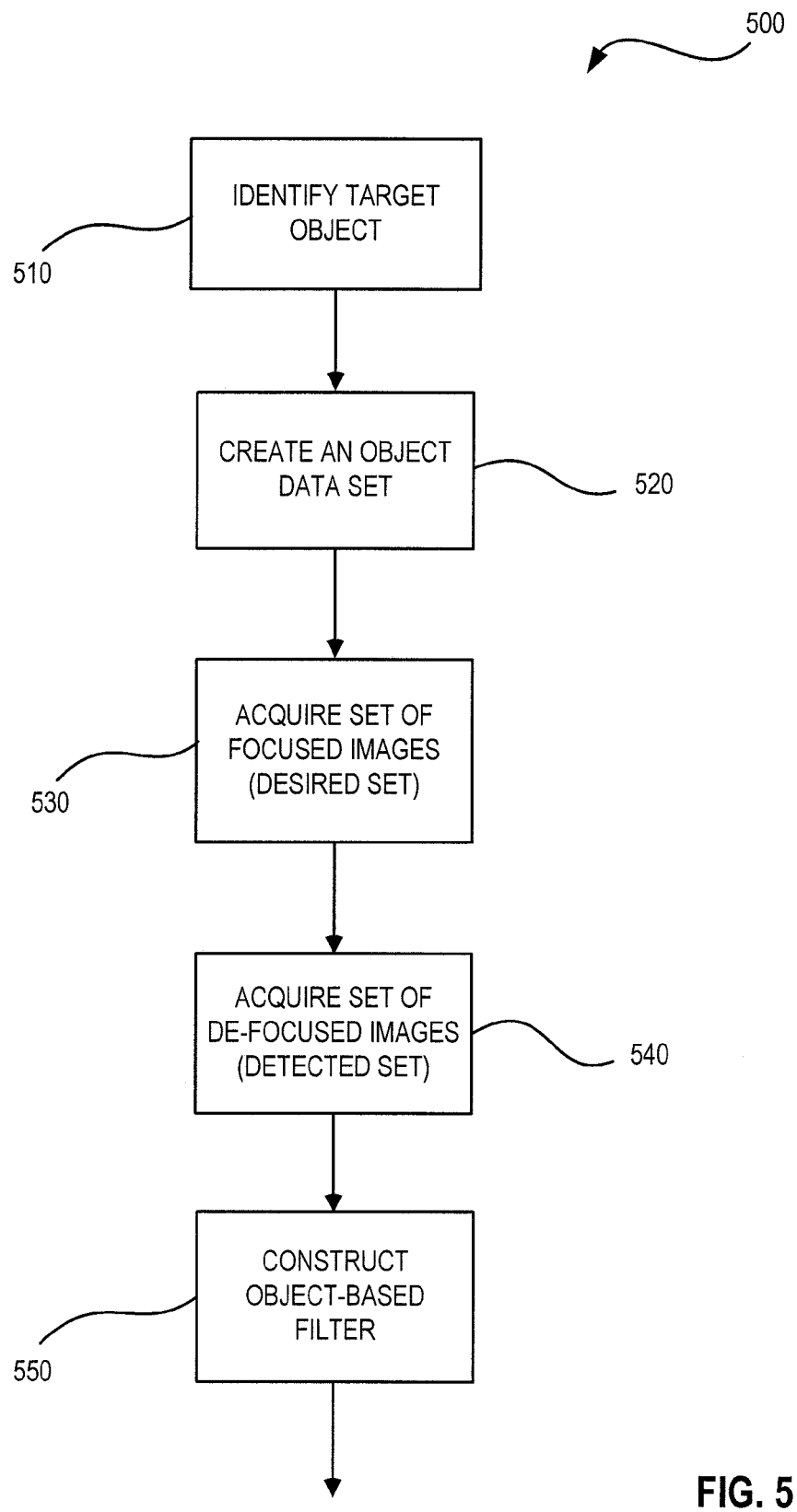
FIG. 5 is a flow chart illustrating details of an object-based filter for use in the pre-processing step of FIG. 4, in accordance with an embodiment.
Figure 6:
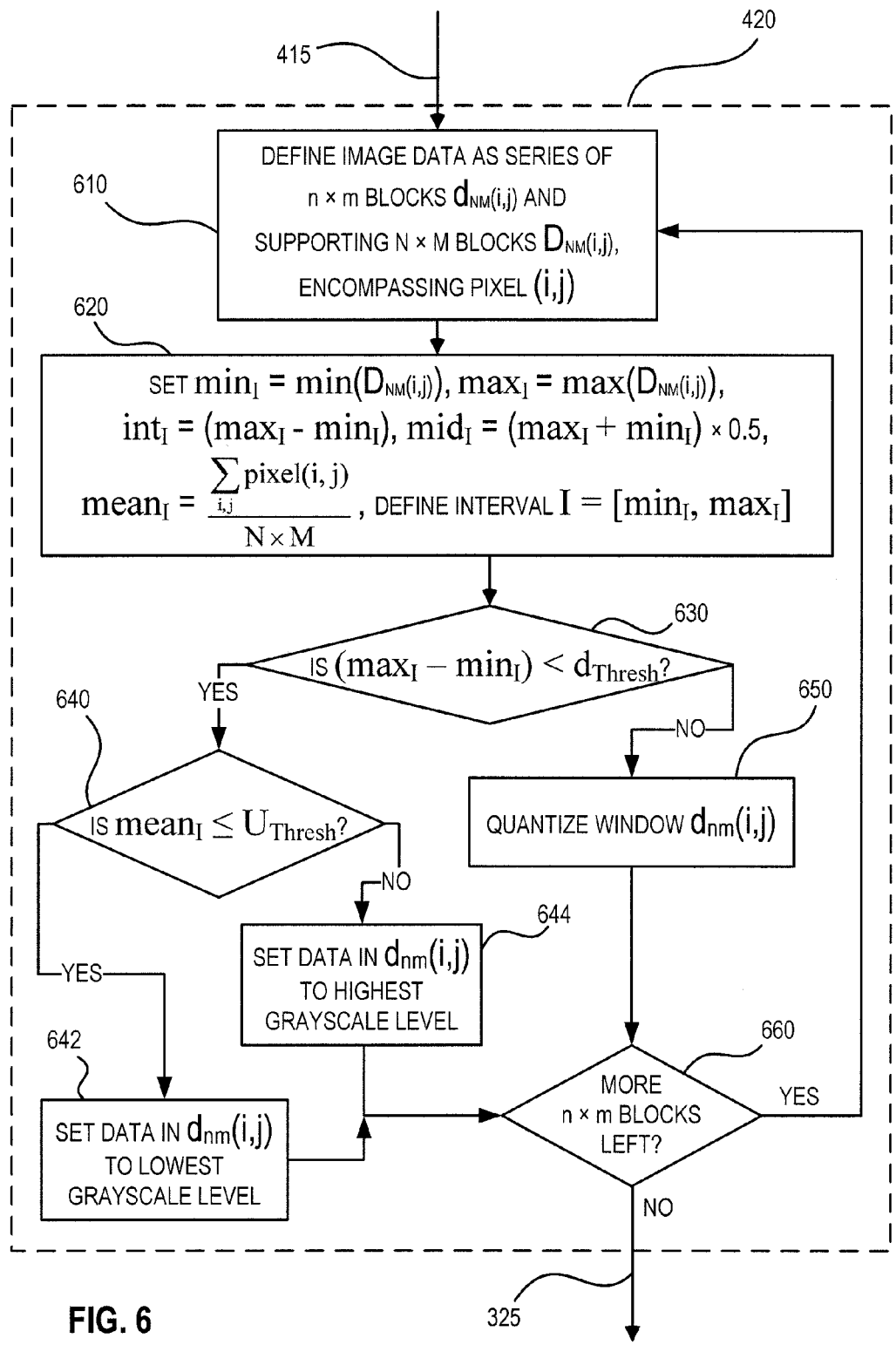
FIG. 6 shows an interpolation process for quantizing an image using a block-wise adaptive quantization, in accordance with an embodiment.

Further details of an exemplary embodiment of sub-steps 410 and 420 are illustrated in FIGS. 5 and 6. Specifically, step 410 applies an OB filter on image data 315, where the OB filter has been optimized for the specific class of objects being imaged, for example according to method 500 (FIG. 5). Step 420 involves the application of an adaptive block-wise quantization on filtered image data 415 produced by step 410, as further detailed in FIG. 6.

An exemplary method 500 for constructing the OB filter is illustrated in FIG. 5. Method 500 begins with a step 510 that identifies a target object. For example, in the present case, it is known that the target object will include alphanumeric characters present in business cards. An object data set is then created, in step 520. In the example of business cards, step 520 collects data including, for instance, alpha-numeric symbols typically found on a business card over a range of font sizes (e.g., 6 pt to 14 pt), font faces (e.g., regular, bold and italic) and font types (e.g., Arial and Times New Roman). A camera (e.g., a webcam or laptop camera such as camera 210) is used to acquire a set of focused images (i.e., "desired set"), in step 530. For example, step 530 includes adjusting focus of the camera to be close-focused such that the desired set may be decoded with the OCR software without any pre-processing. It should be noted here that, for normal intended use of the camera, it would not be practical to close focus the camera, because a close-focused camera would not produce a high quality image at the intended use conjugate distances greater than 65 cm. It is appreciated that cameras referenced herein are digital cameras that provide each image as a frame of pixels wherein each pixel consists of digitized light intensity information from an optical image. The digitized light intensity information may be referred to as "image data" with values selected from a set of "grayscale levels." While grayscale levels commonly denote light intensities transitioning from black (e.g., a grayscale level of 0) to white (e.g., a grayscale level of 255, using 8 bits of precision), the possibility that such levels may represent digitized color information is also contemplated herein.

Continuing to refer to FIG. 5, method 500 continues to a step 540 to acquire a set of defocused images (i.e., "detected set") of the object data set with the webcam or laptop camera at its default focus position (i.e., the intended use conjugate distances, greater than 65 cm). Finally, an OB filter is constructed based on an analysis of the desired dataset and detected dataset, in step 550. The OB filter may be constructed, for example, using a Constrained Least Square ("CLS") filter design technique (such as described in "Computer Imaging: Digital Image Analysis and Processing" by Scott E. Umbaugh, CRC Press, Taylor and Francis Group, Boca Raton, Fla., 2005). The resulting OB filter is used in step 410 of FIG. 4 as the object-based filter.

In an embodiment, method 500 is performed only once, during an initial calibration of camera 210 by a manufacturer, for example. The parameters of the resulting OB filter may then be stored into a non-volatile memory of camera 210 for subsequent use.

Figure 7:
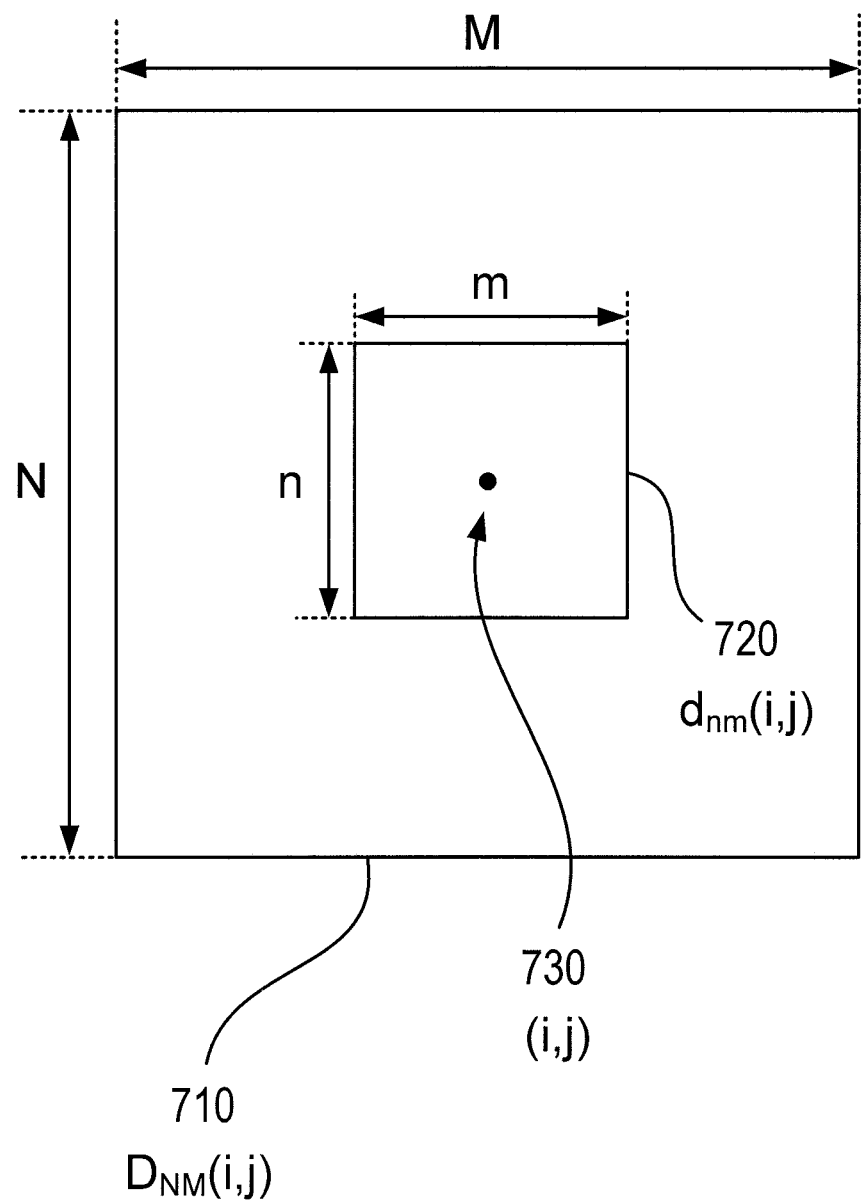
FIG. 7 is a block diagram illustrating the identification of blocks for the quantization process of FIG. 6, in accordance with an embodiment.

Referring now to FIGS. 6 and 7 in conjunction with FIG. 4, further details of step 420 are illustrated, according to an embodiment. As an example, an adaptive block-wise quantization process is applied to filtered image data 415 to convert the filtered image to a ternary (i.e., three-level) image. In other words, the filtered image is interpolated by a factor of β, where β is an interpolation factor and is typically in the range of 1 to 3, to achieve binary super-resolution. β may be, for example, a user-set variable or may be a predetermined factory setting. It is recognized herein that, while the present embodiment is based on a ternary quantization, a binary (i.e., two-level) quantization may suffice in certain applications.

As shown in FIG. 6, adaptive block-wise quantization application step 420 begins with the input of filtered image data 415. Filtered image data 415 is directed to a step 610, in which image data 415 is defined as a series of n×m blocks (each such block denoted by $d_{n,m}(i,j)$), each $d_{nm}(i,j)$ encompassed by a supporting N×M block (denoted by $D_{NM}(i,j)$), both blocks encompassing pixel (i,j), where i and j are index variables. As shown in FIG. 7, n and m are a height and width in pixels of a box 720 encompassing pixel (i,j) 730, while N and M are a height and width in pixels of a larger supporting box 710 encompassing pixel (i,j); therefore N>n and M>m. Although FIG. 7 shows supporting box 710 ($D_{NM}(i,j)$), and n×m block 720 ($d_{nm}(i,j)$) as centered about pixel (i, j) 730, such centering is not required and is not possible in all cases (e.g., when pixel (i, j) 730 is sufficiently close to an edge of an image that box 710 or box 720 would extend past the edge). To maximize resolution, n and m can be made small, but small n and m result in increased computational cost because filtered image data 415 must be divided into more blocks. Typical values of n and m are 2 to 5. To improve accuracy, N and M can be made large, but large N and M reduce spatial resolution. Typical values of N and M are 15 to 30. The characteristics of each block $D_{NM}(i,j)$ are used to provide image-specific context for adaptive processing of each block $d_{nm}(i,j)$, as will now be described.

Step 610 is followed by a step 620, in which a minimum pixel grayscale value $min_I = min(D_{NM}(i,j))$ and a maximum pixel grayscale value $max_I = max(D_{NM}(i,j))$ are defined as the minimum and maximum grayscale values of the image data within an N×M block. Also, grayscale variables $int_I$ and $mid_I$ are defined as $$int_I = (max_I - min_I), mid_I = (max_I + min_I) \times (0.5),$$

and $$mean_I = \frac{\sum_{i,j} pixel(i,j)}{N \times M},$$

where the sum represents the grayscale values of all pixels (i,j) in $D_{NM}(i,j)$. To complete step 620, a grayscale interval I is defined as I=[$min_I$, $max_I$].

After step 620 follows a decision 630 that compares a difference grayscale threshold value $d_{Thresh}$, with ($max_I - min_I$). $d_{Thresh}$ is a processing contrast threshold value that determines whether contrast within a block $D_{NM}(i,j)$ is significant enough that intensive processing is required in $D_{NM}(i,j)$ and may be, for example, a user-set variable, a predetermined factory setting or may be determined from filtered image data 415. In practical terms, $d_{Thresh}$ should be large compared to noise in filtered image data 415 so that pre-processing of the data is not caused by noise alone. For example, $d_{Thresh}$ should typically be about three times a standard deviation of noise in filtered image data 415 (which may be determined for example by computing a standard deviation of "blank" parts of filtered image data 415, such as background areas of an image of a business card).

In decision 630, if ($max_I - min_I$)<$d_{Thresh}$, then block $d_{nm}(i,j)$ corresponds to a uniform region. One way to look at this is that the contrast among pixel values in supporting block $D_{NM}(i,j)$ determines whether the pixels of $d_{nm}(i,j)$ should be quantized individually, or can all be set, as a group, to a high or low grayscale value. If $D_{NM}(i,j)$ has low contrast, then ($max_I - min_I$)<$d_{Thresh}$ so all of $d_{nm}(i,j)$ can be simply set, as a group, to a high or low grayscale value. In this case, step 420 proceeds to another decision 640 that compares $mean_I$ with a union grayscale threshold $U_{Thresh}$ that may be, for example, a user-set variable, a predetermined factory setting or may be determined from filtered image data 415. $U_{Thresh}$ typically denotes a midpoint between grayscale values of printed text (e.g., letters and numerals) and the background upon which such text is printed. For example, $U_{Thresh}$ may be determined by plotting grayscale values of filtered image data 415 and noting peaks P1, P2 in the data corresponding to the grayscale values of text and backgound. In such case, $U_{Thresh}$ may be defined as (P1+P2)/2.

Decision 640 and the steps that depend from it begin the assignment of output data to an output data representation that may or may not correspond to the original grayscale in which filtered image data 415 is input to step 420. For example, "lowest," "middle" and "highest" grayscale values are utilized (see also FIG. 8); such values may be in the original grayscale units (e.g., 0-255 for an eight bit grayscale) or may be in different units. That is, the output data may be represented in one case as 0 being the lowest level, 0.5 being the middle level and 1 being the highest level, or in a different (e.g., eight-bit output) case as 0 being the lowest level, 127 being the middle level and 255 being the highest level. In the examples that follow, eight-bit output is assumed, but it will be apparent that other output data representations may be utilized. Choice of an output data representation may include suitability for a specific OCR process (e.g., consideration of what form of data is best utilized by the OCR process).

If, in decision 640, $mean_I \leq U_{Thresh}$, the image data of $d_{nm}(i,j)$ is quantized in step 642 to a lowest grayscale level (e.g., 0). If $mean_I > U_{Thresh}$, the image data of $d_{nm}(i,j)$ is quantized in step 644 to a highest grayscale level (e.g., 255).

Figure 8:
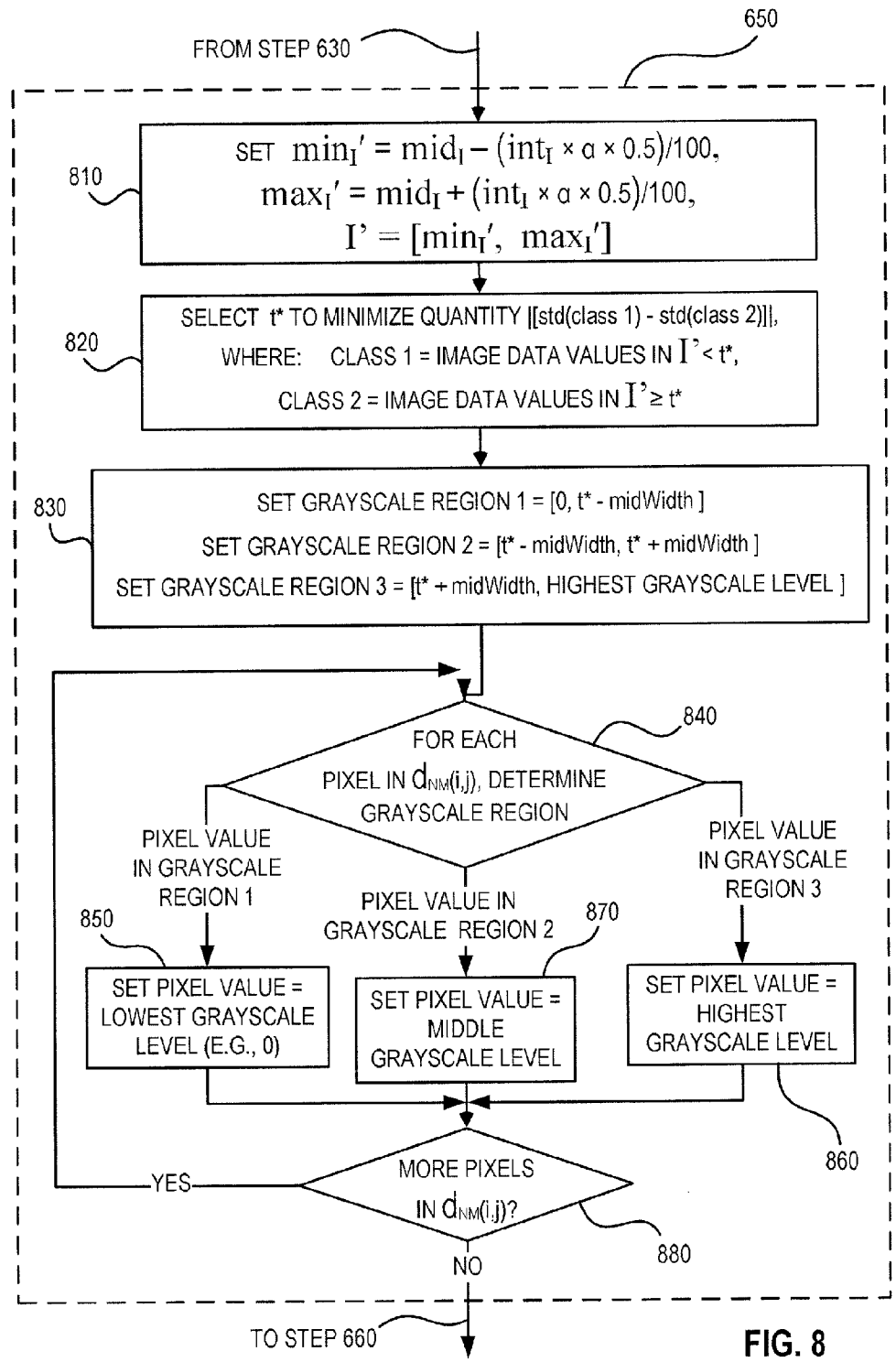
FIG. 8 is a flow chart showing an analysis of regions step for use in the quantization process of FIG. 6, in accordance with an embodiment.

Alternatively, in decision 630 if ($max_I - min_I$)$\geq d_{Thresh}$ then step 420 proceeds to a step 650 where block $d_{nm}(i,j)$ is quantized according to an analysis of regions, described in detail in FIG. 8. One way to look at this is that when there is sufficient contrast in supporting block $D_{NM}(i,j)$, pixels of $d_{nm}(i,j)$ should be individually evaluated and quantized.

Referring now to FIG. 8, step 650 begins with a step 810, in which a percentage α of interval I is selected and denoted by I'=[$min_I'$, $max_I'$], where minimum and maximum interval values $min_I'$ and $max_I'$ are defined as:

$$min_I' = mid_I - (int_I \times \alpha \times 0.5)/100 \text{ and}$$

$$max_I' = mid_I + (int_I \times \alpha \times 0.5)/100.$$

Since α defines the percentage of interval I that is searched for the best t* (see below), α is ideally 100, however in many situations, to reduce computational cost and retain accuracy, values of α in the range of 10 to 50 may be utilized. Successful choices for α can be determined by a system designer by reviewing performance of step 650 with image data supplied by a particular imager with varying image data (e.g., as obtained from various types and conditions of business cards under various illumination conditions).

Continuing to step 820, for each value in interval I', two classes may be defined as above or below a grayscale threshold value t. That is, the two classes are class1=(values in block $D_{NM}(i,j))<t$ and class2=(values in block $D_{NM}(i,j))\geq t$.

Another way of expressing these classes is, class1=[$\min_{I'}$,t], class2=[t,$\max_{I'}$].

To complete step 820, a value t* is selected as a threshold value that minimizes an absolute value of the quantity [std (class 1)−std(class 2)], where std( ) denotes the well-known standard deviation formula. t* can be determined in various ways, such as by calculating class1, class2 and [std(class 1)−std(class 2)] for all possible values of t (knowing, for example, that t must lie within I'), or through use of search algorithms.

A further variable midWidth is defined; midWidth may be, for example, a user-set variable or may be a predetermined factory setting, and is typically in the range of 1% to 5% of dynamic range (e.g., about 2 to 10 grayscale units, in a 0-255 grayscale system). midWidth determines width of an interval of pixel grayscale values around t* that will be set to a middle gray value in ternary quantization. Successful choices for midWidth can be determined by a system designer by reviewing performance of step 650 with image data supplied by a particular imager with varying image data (e.g., as obtained from various types and conditions of business cards under various illumination conditions). Step 830 then defines three distinct grayscale regions (assuming grayscale levels from 0 to 255):

Grayscale region 1: [0,$t^*$−midWidth)

Grayscale region 2: [$t^*$−midWidth,$t^*$+midWidth]

Grayscale region 3: ($t^*$+midWidth,255].

Decision 840 determines the grayscale region for each pixel of block $d_{nm}(i,j)$ using these three regions, and step 650 proceeds to a different action depending on which region the grayscale value of each such pixel falls into. For instance, if in step 840, a pixel in $d_{nm}(i,j)$ is found to fall within Region 1, step 850 resets the value of that pixel to the lowest grayscale level (e.g., 0). If, in step 840, the pixel is found to fall within Region 3, step 860 resets the value of that pixel to the highest grayscale level (e.g., 255). If, in step 840, the pixel is found to fall within Region 2, step 870 resets the value of that pixel to a middle level (e.g., 127 in an eight-bit output system). After any of steps 850, 860 and 870, step 650 proceeds to a decision 880 to determine if any more pixels in $d_{nm}(i,j)$ remain to be processed. If so, step 650 returns to step 840 to process more pixels; if not, step 650 is complete and returns to step 660 (FIG. 6).

Therefore, steps 840 through 880 quantize data of each pixel in block $d_{nm}(i,j)$ to one of three values: the lowest grayscale value, a middle grayscale value or the highest grayscale value.

Referring back to FIG. 6, when step 650 (FIG. 8) is complete, step 420 returns to step 660, in which a decision is made as to whether more n×m blocks are left in the filtered image data to be analyzed. If the answer to decision 660 is "YES", then step 420 returns to step 610, where another block is selected. If the answer to decision 660 is "NO", then the results are fed out to the OCR processing as conditioned image data 325.

While the examples described in this disclosure relate to the pre-processing of images captured by a webcam or laptop camera for subsequent OCR processing, it will be appreciated by those skilled in the art that the processes described and claimed herein may be applied to the pre-processing of image data for a variety of tasks other than OCR. The pre-processing algorithm itself is different from a standard sharpening and noise reduction filter because the sharpening filter is object-based and the adaptive quantization algorithm performed in step 420 uses image statistics of the local image data context, therefore the quantization itself adapts to variable background and/or font contrast. The algorithm can be used in other task-based imaging system applications that may benefit from pre-conditioning of the captured image to enhance the task performance. For instance, the pre-processing algorithm described above may be incorporated into a task-based imaging system, in which imaging optics, pre-processing and image signal processing are jointly optimized for the specific task at hand. Application of the methods described herein to such images may thus be considered to fall within the scope of the disclosed embodiments. It should thus be noted that the matter contained in the above description or shown in the accompanying drawings should be interpreted as illustrative and not in a limiting sense.

What is claimed is:

1. A method of pre-processing a defocused image of an object, the method comprising:
   defining grayscale thresholds $d_{Thresh}$ and $U_{Thresh}$ as values within a grayscale having a highest grayscale level and a lowest grayscale level;
   using a processor, applying an object-based sharpening filter on the defocused image to produce a sharper image; and
   using a processor, quantizing the sharper image using block-wise quantization, by:
      dividing the sharper image into a series of n×m blocks, wherein each n×m block is a block of image data pixels n pixels in height and m pixels in width;
      defining a supporting N×M block corresponding to each n×m block, wherein
         each N×M block is a block of image data pixels N pixels in height and M pixels in width,
         N>n and M>m, and
         the N×M block encompasses the n×m block; and
      for each specific n×m block:
         defining $\max_I$ as a maximum pixel grayscale value within the supporting N×M block corresponding to the specific n×m block,
         defining $\min_I$ as a minimum pixel grayscale value within the supporting N×M block corresponding to the specific n×m block, $$\text{defining mean}_I = \frac{\sum_{i,j} \text{pixel}(i, j)}{N \times M} \text{ for all pixels } (i, j) \text{ in the } N \times M \text{ block,}$$

setting all pixels within the specific n×m block to the highest grayscale level, if $(\max_I - \min_I) < d_{Thresh}$ and $\text{mean}_I > U_{Thresh}$, and setting all pixels within the specific n×m block to the lowest grayscale level, if $(\max_I - \min_I) < d_{Thresh}$ and $\mathrm{mean}_I \leq U_{Thresh}$.

2. The method of claim 1, further comprising:
defining a percentage α;
defining an interval of values I'=[min$_I$', max$_I$'] wherein min$_I$'=(max$_I$+min$_I$)×(0.5)−((max$_I$−min$_I$) ×α×0.5)/100, and wherein max$_I$'=(max$_I$+min$_I$)×(0.5)+((max$_I$−min$_I$) ×α×0.5)/100; and determining a threshold value t* within the interval I' that minimizes a quantity |[std(class 1)−std(class 2)]|, wherein class1 includes pixel values within the N×M block falling into the interval [min$_I$', t*] and class2 includes pixel values within the N×M block falling into the interval [t*, max$_I$'].

3. The method of claim 2, further comprising:
defining a parameter midWidth;
quantizing all pixels in the specific n×m block whose values are less than (t*−midWidth) to the lowest grayscale value;
quantizing all pixels in the specific n×m block whose values are greater than (t*+midWidth) to the highest grayscale value; and
quantizing all pixels in the specific n×m block whose values are greater than (t*−midWidth) but lower than (t*+midWidth) to a middle grayscale value.

4. The method of claim 1, wherein applying the object-based sharpening filter comprises
acquiring a set of focused images of the object,
acquiring a set of defocused images of the object, and
constructing the object-based sharpening filter based on the set of focused images and the set of defocused images, utilizing a Constrained Least Square (CLS) filter design technique.

5. A system for generating decoded text data from alphanumeric information printed upon an object, comprising:
a camera that obtains image data of the alphanumeric information; and
a pre-processor that
(a) performs block-wise quantization of the image data to form conditioned image data by:
dividing the image data into a series of n×m blocks, wherein each n×m block is a block of image data pixels n pixels in height and m pixels in width;
defining a supporting N×M block corresponding to each n×m block, wherein
each N×M block is a block of image data pixels N pixels in height and M pixels in width,
N>n and M>m, and
the N×M block encompasses the n×m block; and
for each specific n×m block:
defining max$_I$ as a maximum pixel grayscale value within the supporting N×M block corresponding to the specific n×m block,
defining min$_I$ as a minimum pixel grayscale value within the supporting N×M block corresponding to the specific n×m block, $$\text{defining mean}_I = \frac{\sum_{i,j} \text{pixel}(i, j)}{N \times M} \text{ for all pixels } (i, j) \text{ in the } N \times M \text{ block},$$

setting all pixels within the n×m blocks to the highest grayscale level, if $(\max_I - \min_I) < d_{Thresh}$ and $\mathrm{mean}_I > U_{Thresh}$, and
setting all pixels within the specific n×m block to the lowest grayscale level, if $(\max_I - \min_I) < d_{Thresh}$ and $\mathrm{mean}_I \leq U_{Thres}$, and
(b) performs optical character recognition on the conditioned image data to generate the decoded text data.

6. The system of claim 5, wherein the pre-processor performs object based filtering of the image data before performing the block-wise quantization.

7. A system for generating decoded text data from alphanumeric information printed upon an object, comprising:
a camera that obtains image data of the alphanumeric information; and
a pre-processor that
(a) performs block-wise quantization of the image data to form conditioned image data by:
dividing the image data into a series of n×m blocks, wherein each n×m block is a block of image data pixels n pixels in height and m pixels in width;
defining a supporting N×M block corresponding to each n×m block, wherein
each N×M block is a block of image data pixels N pixels in height and M pixels in width,
N>n and M>m, and
the N×M block encompasses the n×m block; and
for each specific n×m block:
defining max$_I$ as a maximum pixel grayscale value within the supporting N×M block corresponding to the specific n×m block,
defining min$_I$ as a minimum pixel grayscale value within the supporting N×M block corresponding to the specific n×m block, $$\text{defining mean}_I = \frac{\sum_{i,j} \text{pixel}(i, j)}{N \times M} \text{ for all pixels } (i, j) \text{ in the } N \times M \text{ block},$$

setting all pixels within the n×m blocks to the highest grayscale level, if $(\max_I - \min_I) < d_{Thresh}$ and $\mathrm{mean}_I > U_{Thresh}$, and
setting all pixels within the specific n×m block to the lowest grayscale level, if $(\max_I - \min_I) < d_{Thresh}$ and $\mathrm{mean}_I \leq U_{Thresh}$, and
(b) performs optical character recognition conditioned image data to generate the decoded text data;
wherein the pre-processor performs object based filtering of the image data before performing the block-wise quantization; and
wherein the pre-processor generates a filter to perform the object based filtering, from a set of focused images and a set of defocused images, utilizing a Constrained Least Square (CLS) filter design technique.

8. The system of claim 5, wherein the camera is one of a webcam and a laptop camera, and the pre-processor is one of a laptop computer and a desktop computer.

9. The system of claim 6, wherein the pre-processor processes the decoded text utilizing contact management software.

10. A system for generating decoded text data from alphanumeric information printed upon an object, comprising:
a camera that obtains image data of the alphanumeric information; and a pre-processor that
(a) performs block-wise quantization of the image data to form conditioned image data by:
  dividing the image data into a series of n×m blocks, wherein each n×m block is a block of image data pixels n pixels in height and m pixels in width;
  defining a supporting N×M block corresponding to each n×m block, wherein
  each N×M block is a block of image data pixels N pixels in height and M pixels in width,
  N>n and M>m, and
  the N×M block encompasses the n×m block; and
  for each specific n×m block:
    defining $\max_I$ as a maximum pixel grayscale value within the supporting N×M block corresponding to the specific n×m block,
    defining $\min_I$ as a minimum pixel grayscale value within the supporting N×M block corresponding to the specific n×m block, $$\text{defining mean}_I = \frac{\sum_{i,j} \text{pixel}(i,j)}{N \times M} \text{ for all pixels } (i,j) \text{ in the } N \times M \text{ block,}$$

setting all pixels within the n×m blocks to the highest grayscale level, if $(\max_I - \min_I) < d_{Thresh}$ and $\text{mean}_I > U_{Thresh}$, and
    setting all pixels within the specific n×m block to the lowest grayscale level, if $(\max_I - \min_I) < d_{Thresh}$ and $\text{mean}_I \leq U_{Tresh}$, and (b) performs optical character recognition on the conditioned image data to generate the decoded text data; and
wherein the pre-processor performs the block-wise quantization by:
utilizing a percentage α to define an interval of values I'=[$\min_I'$, $\max_I'$] wherein $$\min_I' = (\max_I + \min_I) \times (0.5) - ((\max_I - \min_I) \times \alpha \times 0.5)/100,$$
and wherein $$\max_I' = (\max_I + \min_I) \times (0.5) + ((\max_I - \min_I) \times \alpha \times 0.5)/100;$$

determining a threshold value t* within the interval I' that minimizes a quantity |[std(class 1)−std(class 2)]|, wherein class1 includes pixel values within the N×M block falling into the interval [$\min_I'$, t*] and class2 includes pixel values within the N×M block falling into the interval [t*, $\max_I'$]; and
utilizing a parameter midWidth to quantize
  all pixels in the specific n×m block whose values are less than (t*−midWidth) to the lowest grayscale value,
  all pixels in the specific n×m block whose values are greater than (t*+midWidth) to the highest grayscale value, and
  all pixels in the specific n×m block whose values are greater than (t*−midWidth) but lower than (t*+midWidth) to a middle grayscale value.

* * * * *